Oct. 11, 1966 R. H. YEN 3,278,731

MULTIPLIER HAVING ADDER AND COMPLEMENTER CONTROLLED BY MULTIPLIER DIGIT COMPARATOR

Filed Dec. 18, 1963 2 Sheets-Sheet 1

INVENTOR
RICHARD H. YEN
BY
Carl V. Olson
ATTORNEY

INVENTOR.
RICHARD H. YEN
BY
Carl V. Olson
ATTORNEY

United States Patent Office 3,278,731

Patented Oct. 11, 1966

3,278,731

MULTIPLIER HAVING ADDER AND COMPLEMENTER CONTROLLED BY MULTIPLIER DIGIT COMPARATOR

Richard H. Yen, Cherry Hill, N.J., assignor to Radio Corporation of America, a corporation of Delaware Filed Dec. 18, 1963, Ser. No. 331,562
7 Claims. (Cl. 235—160)

Figure 1:
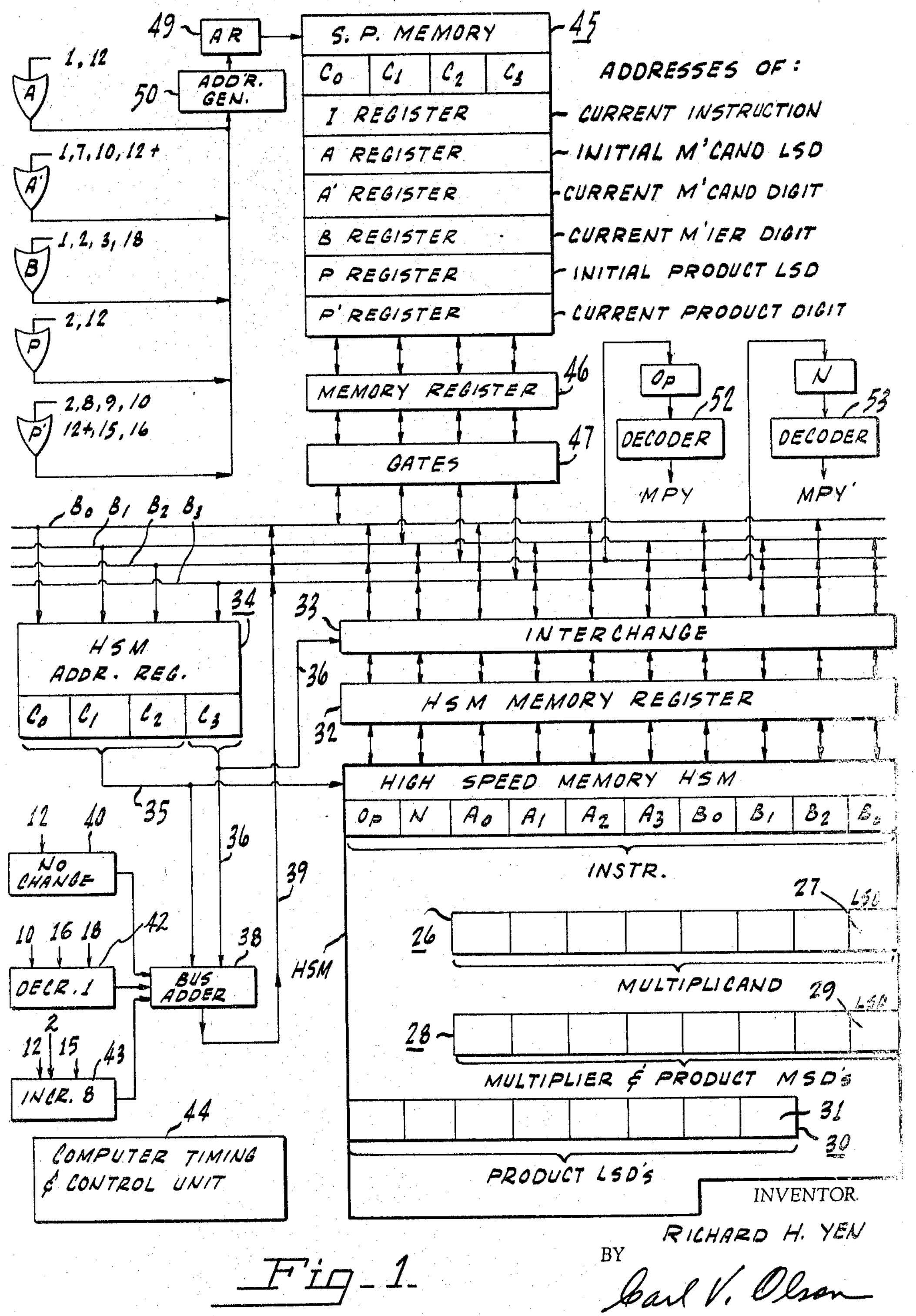

This invention relates to electronic digital computers including means for accomplishing arithmetic multiplication by repeated additions of the multiplicand.

It is the general object of this invention to provide an improved multiplier characterized in that it employs a modestly more complex apparatus to accomplish multiplication at an appreciably increased speed.

Briefly, the multiplier of the invention involves adding the multiplicand a number of times determined by the value of the least-significant multiplier digit. Multiple additions of the multiplicand to the resulting partial product are repeated for each successive more-significant multiplier digit. Use is made of the concept that if a multiplier digit is 6 or more, the number of times that the multiplicand must be added can be reduced by complementing the partial product, adding the multiplicand a number of times equal to the 10's complement of the multiplier digit, complementing the resulting product, and incrementing the next-more-significant digit. A further improvement in speed of operation results from an avoidance of unnecessary steps of complementing a number followed by complementing the complemented number.

According to an example of the invention, there is provided a multiplier for performing multiplication by manipulations associated with each successive multiplier digit starting with the least-significant digit. Means are provided for determining whether the multiplier digit and the previous next-less significant multiplier digit are in different ones of a lower group including numbers 0 through 5 and an upper group including numbers 6 through 9, and if so, to 9's complement the partial product for a following addition step.

Means are provided which operate when the multiplier digit is a number in the lower group to add the multiplicand to the complemented or uncomplemented partial product a number of times equal to the value of the multiplier digit.

Additional means are provided which operate when the multiplier digit is in the upper group to add the multiplicand to the complemented or uncomplemented partial product a number of times equal to the 10's complement of the value of the multiplier digit, to 9's complement the last digit only of the resulting product, and to increment the next-more-significant multiplier digit.

Figure 2:
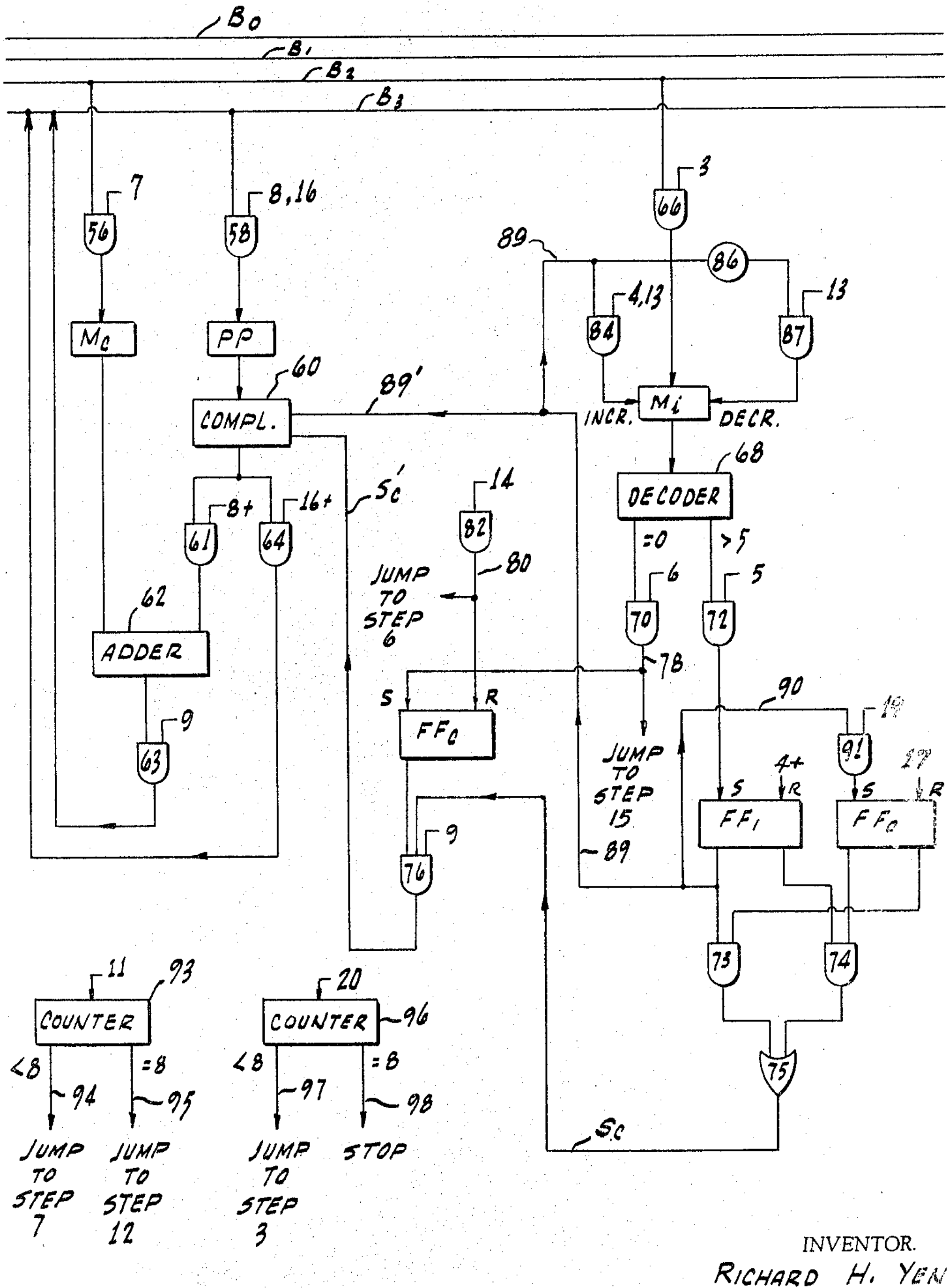

In the drawing:

FIG. 1 and FIG. 2, taken together, constitute a diagrammatic representation of an electronic computer having an arithmetic multiplier facility according to the invention.

DESCRIPTION OF COMPUTER

Reference is now made to FIG. 1 for a description of an illustrative computer providing an environment for the multiplier of the invention. The computer, which is character-organized, includes a high speed memory HSM for the storage of ten-character instructions, and of data words of any desired number of characters. Each character includes six binary bits, not counting a parity bit which will be ignored in the description. A character can be an alphabetic character, a numeric decimal digit 0 through 9, or a punctuation or other symbol. The instruction format illustrated in memory HSM includes an operation code character O*p*; an operation option character N; four A address characters $A_0$, $A_1$, $A_2$ and $A_3$; and four B address characters $B_0$, $B_1$, $B_2$ and $B_3$. Data word storage locations in memory HSM include an eight-digit (i.e., eight-character) word location 26 for storing a multiplicand, an eight-digit storage location 28 for a multiplier, and an eight-digit storage location for the eight least-significant digits of a product resulting from multiplication of the multiplicand by the multiplier. The multiplier storage location 28 is also used, as multiplication proceeds, for storing the eight most-significant digits of the resulting product.

The four A address characters $A_0$, $A_1$, $A_2$ and $A_3$ of the multiply instruction constitute the address of the least-significant digit location 27 of the multiplicand word location 26. Similarly, the four B address characters $B_0$, $B_1$, $B_2$ and $B_3$ of the multiply instruction constitute the address of the least-significant digit storage location 29 of the multiplier word location 28. The least-significant digit storage location 31 for the resulting product is a location eight locations removed from the least-significant digit location 29 of the multiplier word location 28. This arrangement permits indirect addressing of the sixteen-character storage location 28, 30 where the resulting product is assembled.

Instruction and data words of up to ten characters may be transferred between the memory HSM and the memory register 32. One, two, three or four characters may be transferred at a time through an interchange 33 to a respective one or ones of four six-conductor busses B0, B1, B2 and B3.

Any one character storage location in the high speed memory HSM may be addressed by four six-bit characters $C_0$, $C_1$, $C_2$ and $C_3$ in an address register 34. The characters $C_0$, $C_1$ and $C_2$ are directed over a line 35 to memory HSM to access a complete ten-character instruction word or an eight-character data word. The character $C_3$ in the address register 34 (and other control signals) are applied over line 36 to the interchange 33 to select from one to four characters for transfer between the memory register 32 and the busses B0 through B3. The lines 35 and 36 from the address register 34 are also connected to the input of a bus adder 38 from which an unchanged, an incremented or a decremented address may be directed over line 39 to the busses B0 through B3.

An address may pass unchanged through the bus adder 38 in response to a signal from a control unit 40. An address supplied to the bus adder 38 is decremented by one in response to a signal from a control unit 42. An address supplied to the bus adder 38 can be incremented by eight in response to a signal from a control unit 43. The control units 40, 42 and 43 operate in response to designated timing pulse inputs. Timing pulses and control signals for operation of the computer are supplied by a computer timing and control unit 44.

The address register 34 for the memory HSM receives four-character addresses via busses B0 through B3 from four-character address "registers" in a scratch pad memory 45 via a memory register 46 and gates 47. The scratch pad memory 45 includes a number of four-character storage locations used as registers, the registers of particular interest in connection with the multiply function being designated by A, A′, B, P and P′. The I register is used for the address of a current instruction to be executed.

If the instruction to be executed is the multiply instruction, the A register is used for the address of the least-significant decimal digit 27 of the multiplicand, the A′ register is used for the address of the current multiplicand decimal digit being used in the multiplication process, the B register is used for the address of the current multiplier decimal digit (initially the least-significant multiplier digit 29) being used in the multiplication process, the P register is used for the address of the least-significant decimal digit 31 of the storage location for the product, and the P′ register is used for the address of the current product or partial product decimal digit during the multiplication process.

Any one of the four-character storage locations or "registers" in the scratch pad memory 45 may be addressed by a single six-bit character. The address register 49 contains the six-bit character currently used for addressing the scratch pad memory 45. The six-bit character in the address register 49 is supplied from an address generator 50. The address generator 50 generates addresses of registers A, A′, B, P and P′ in response to signals supplied to the address generator 50 from respective similarly-designated gates A, A′, B, P and P′. The listed gates operate in response to any one of the respective numerically-designated timing pulses.

An operation register O*p* and an operation option register N are connected to receive the two respective operation characters from an instruction in high speed memory HSM via memory register 32, interchange 33 and busses B2 and B3. Decoders 52 and 53 decode the contents of registers O*p* and N when the characters in registers O*p* and N are characters calling for multiplication, the decoders 52 and 53 provide outputs on leads MPY and MPY′ which control the computer timing and control unit 44 in the performance of the multiply instruction.

DESCRIPTION OF MULTIPLIER

Reference is now made to FIG. 2 for a description of the multiplier hardware which cooperates with the general computer hardware shown in FIG. 1 in the performance of multiplication. The busses B0 through B3 in FIG. 2 are an extension of the similarly-labeled busses in FIG. 1. The multiplier performs multiplication of a multiplicand having eight decimal digits by a multiplier having eight decimal digits.

A multiplicand register $M_c$ is connected to receive multiplicand digits, one at a time, from the memory HSM via memory register 32, interchange 33, bus B2 and gate 56. A one-digit partial product register PP is similarly connected to receive a partial product digit from memory HSM via bus B3 and gate 58. The output of partial product digit register PP is connected through a complementor 60 and a gate 61 to an input of a two-digit adder 62 having another input from the multiplicand digit register $M_c$. The output of adder 62 is connected through a gate 63 back to the bus B3. The output of complementor 60 is also connected through a gate 64 back to the bus B3.

A one-digit multiplier register $M_1$ is connected to receive multiplier digits, one at a time, from memory HSM via bus B2 and gate 66. The output of multiplier register $M_1$ is connected to a decoder 68 having outputs connected to gates 70 and 72. The output connected to gate 70 is energized when the digit in register $M_1$ is equal to 0; and the output connected to the gate 72 is energized when the digit in register $M_1$ is greater than 5.

The output of gate 72 is connected to the set input of a multiplier digit group indicating flip-flop $FF_1$ which is used to indicate whether the multiplier decimal digit is in the lower group less than 6 or in the upper group greater than 5. Another previous multiplier digit group indicating flip-flop $FF_0$ is used to indicate whether the previously-manipulated, next-less-significant multiplier digit was in the lower group less than 6 or in the upper group greater than 5.

The outputs of flip-flops $FF_1$ and $FF_0$ are connected through gates 73, 74 and 75 to a complementing signal output line $S_c$. The line $S_c$ is energized when the multiplier digit being manipulated and the next-less-significant digit previously manipulated fall within different lower and upper groups, where the lower group includes decimal digits having values of 0 through 5, and the upper group includes decimal digits having values in the range of 6 through 9. The complementing signal line $S_c$ is connectable through a gate 76 and a line $S_c'$ to an input of complementor 60 which activates the complementor to 9's complement the partial product digit from register PP.

An output 78 from gate 70 is connected to computer timing and control unit 44 (FIG. 1) to cause a jump to a step 15 of the multiplication process to be described, and is also connected to the set input of a complementing flip-flop $FF_c$ (FIG. 2). The "1" output of flip-flop $FF_c$ is connected to enable gate 76. The reset input of flip-flop $FF_c$ is connected to receive a signal over line 80 from a gate 82. The output line 80 from gate 82 is also connected to the computer timing and control unit 44 (FIG. 1) to cause a jump to a step 6 of the multiplication process to be described.

The "1" output line 89 of multiplier digit group indicating flip-flop $FF_1$ (FIG. 2) is connected through a gate 84 to an incrementing input of multiplier digit register $M_1$. The line 89 is also connected through an inverter 86 and a gate 87 to a decrementing input of multiplier digit register $M_1$. The "1" output of multiplier digit group indicator flip-flop $FF_1$ is also connected over line 89′ to an energizing input of complementor 60, and is connected over a line 90 and through a gate 91 to the set input of flip-flop $FF_0$.

Multiplicand digit counter 93 and multiplier digit counter 96 are provided to operate in response to respective designated timing pulse inputs. Counter 93 has an output 94 which is energized when the count in the counter is less than 8. Another output 95 is energized when the count in the counter equals 8. Similarly, counter 96 has an output 97 which is energized when the count in the counter is less than 8, and has another output 98 which is energized when the count in the counter equals 8. The outputs of the counters 93 and 96 are connected to the computer timing and control unit 44 (FIG. 1) for effecting respective appropriate controls of the multiplication process to be described.

OPERATION

Reference will now be made to FIGS. 1 and 2 for a description of the operation of the computer in the performance of multiplication of a multi-digit multiplicand number by a multi-digit multiplier number. Reference will be made to successive steps numbered 1 through 21. Each step is performed under the control of a correspondingly-numbered timing pulse generated by the computer timing and control unit 44. The numbered inputs to the various gates and units in FIGS. 1 and 2 represent correspondingly numbered timing pulse signals. Step 1 takes place upon the occurrence of timing pulse 1, step 2 takes place upon the occurrence of timing pulse 2, etc. Each step is followed by the next higher numbered step except in those instances where signals are generated which act through the computer timing and control unit 44 to cause a jump back to an iterative loop starting with an earlier step. The computer manipulates only one digit of the multiplicand and one digit of the multiplier at a time.

It is assumed that the computer in the performance of a stored program has reached an instruction calling for multiplication. The O*p* and N digits of the multiply instruction have been staticized in the O*p* and N registers and have been decoded to provide outputs MPY and MPY′ which are supplied to the computer timing and control unit 44 to initiate execution of the multiply instruction. The computer timing and control unit 44 then supplies successive timing pulses 1 through 21 for enabling corresponding steps 1 through 21.

*(I) Complete staticizing of multiply instruction*

*Step 1.*—Transfer address $A_0$, $A_1$, $A_2$, $A_3$ of the least-significant multiplicand digit from the high speed memory location 27 to registers A and A′. Transfer the address $B_0$, $B_1$, $B_2$, $B_3$ of the least-significant multiplier digit from high speed memory storage location 29 to the B register.

*Step 2.*—Read the contents of the B register into the memory register 46 and then transfer the contents through the high speed memory address register 34 to the bus adder 38. The timing pulse 2 is applied to incrementing unit 43 for the purpose of incrementing the address in the bus adder by eight. The incremented address is then stored in both of the P and P′ registers. The four-digit number in the P and P′ registers is now the address of the least-significant product digit location 31 in memory HSM.

*(II) Successively multiply the multiplicand digits by one multiplier digit*

(A) TEST TO DETERMINE WHETHER COMPLEMENTING IS NECESSARY, AND WHETHER MULTIPLICATION BY CURRENT MULTIPLIER DIGIT IS UNNECESSARY OR COMPLETED

*Step 3.*—Use the address in the B register to fetch the least-significant remaining multiplier digit from memory HSM and put it through gate 66 (FIG. 2) into multiplier digit register $M_1$.

*Step 4.*—If multiplier digit group indicating flip-flop $FF_1$ is set, enable gate 84 to increment the multiplier digit in multiplier register $M_1$. Then, reset flip-flop $FF_1$.

*Step 5.*—If multiplier digit in multiplier register $M_1$ is greater than 5 as evidenced by the corresponding output from decoder 68, enable gate 72 and set multiplier digit group indicating flip-flop $FF_1$. If states of multiplier digit group indicating flip-flop $FF_1$ and previous multiplier digit group indicating flip-flop $FF_0$ are different, the gates 73, 74 and 75 cause the generation on line $S_c$ of a complementing signal.

*Step 6.*—If the digit in multiplier register $M_1$ is 0 (or the equivalent of 10), as evidenced by a corresponding output from decoder 68, enable gate 70 to generate a signal on line 78 which causes a jump to step 15 because multiplication by the multiplier digit is unnecessary or completed. Signal on line 78 also sets complementing flip-flop $FF_c$.

(B) ADD CORRESPONDING DIGITS OF MULTIPLICAND AND PARTIAL PRODUCT

*Step 7.*—Use the address in the A′ register to access a multiplicand digit in memory HSM and transfer it through gate 56 to the multiplicand digit register $M_c$.

*Step 8.*—Use the address in the P′ register to access a partial product digit in memory HSM and transfer it through gate 58 to the partial product digit register PP.

*Step 9.*—If complementing signal is present on line $S_c$, and if gate 76 is enabled by complementing flip-flop $FF_c$, apply complementing signal over line $S_c'$ to energize complementor 60. Add the multiplicand digit in multiplicand register $M_c$ and the complemented or uncomplemented partial product digit from partial product register PP in the adder 62 and apply the sum through gate 63 and through the bus to the location in memory HSM determined by the address in the P′ register.

*Step 10.*—Use the bus adder 38 (FIG. 1) to decrement the multiplicand digit address in the A′ register. Use the bus adder 38 to decrement the partial product digit address in the P′ register.

*Step 11.*—Advance multiplicand digit counter 93 (FIG. 2). If output of counter 93 is less than 8 as evidenced by energization of output lead 94, jump back to step 7.

*Step 12.*—Transfer initial multiplicand address (of the least-significant multiplicand digit) in the A register to the A′ register. Increment the partial product address in the P′ register by eight.

*Step 13.*—If multiplier digit group indicating flip-flop $FF_1$ is set, enable gate 84 to cause incrementing of the multiplier digit in the multiplier register $M_1$. If the flip-flop $FF_1$ is reset, as evidenced by energization of the output of inverter 86, the gate 87 is enabled to cause decrementing of the multiplier digit in the multiplier register $M_1$.

(C) REPEAT THE ADDITION A NUMBER OF TIMES EQUAL TO THE VALUE OF THE MULTIPLIER DIGIT OR THE 10'S COMPLEMENT THEREOF

*Step 14.*—Use the output on line 80 from gate 82 to cause a jump back to step 6. The signal on line 80 resets the complementing flip-flop $FF_c$ and disables gate 76 so that the complementing signal $S_c'$ is blocked and prevented from activating the complementor 60.

*Step 15.*—Use the address in the P′ register to fetch a partial product digit which is then applied through gate 58, through partial product register PP, through complementor 60 and through gate 64 back to the high speed memory location specified by the contents of the P′ register. The partial product digit is complemented if flip-flop $FF_1$ is set.

*Step 16.*—Use bus adder 38 to decrement the partial product digit address in the P′ register.

*Step 17.*—Reset previous multiplier digit group indicating flip-flop $FF_0$.

*Step 18.*—Use the bus adder 38 to decrement the multiplier digit address in the B register.

*Step 19.*—Enable gate 91 to cause a transfer over line 90 of the state of multiplier digit group indicating flip-flop $FF_1$ to the previous multiplier digit group indicating flip-flop $FF_0$.

*(III) Repeat to accomplish multiplication of the multiplicand by the remaining multiplier digits*

*Step 20.*—Advance counter 96. If count in the counter 96 is less than 8 as evidenced by energization of output lead 97, jump back to step 3. If count in counter 96 is equal to 8, use energization of output lead 98 to signal the end of the multiplication.

*Step 21.*—When step 21 is reached, the complete sixteen-digit product is in the sixteen-digit storage location 28, 30 in high speed memory HSM as defined by the address in the P register of the least-significant digit location 31.

SUMMARY

The arithmetic processes performed by the multiplier will now be summarized and then illustrated with an example of the multiplication of a specific three-digit multiplicand number by a specific three-digit multiplier number.

Multiplication is performed by the following steps of manipulation for each successive multiplier digit starting with the least-significant digit:

Determine whether the multiplier digit and the previous next-less-significant multiplier digit are in different ones of a lower group including numbers 0 through 5 and an upper group including numbers 6 through 9, and if so, 9's complement the partial product for a following addition step.

If the multiplier digit is a number in the lower group, add the multiplicand to the partial product a number of times equal to the value of the multiplier digit, or If the multiplier digit is in the upper group, add the multiplicand to the partial product a number of times equal to the 10's complement of the value of the multiplier digit, 9's complement the last digit only of the resulting product and increment the next-more significant multiplier digit.

EXAMPLE

| | | |
|---|---|---|
| | 130 | Multiplicand |
| | ×572 | Multiplier |
| ×2: | 000 | Initial partial product |
| | +130 | Add multiplicand 2 times |
| | +130 | |
| | 260 | |
| | 0 | Product digit |
| | 026 | Partial product for next multiplication |
| ×7: | 973 | 9's complement of partial product |
| | +130 | Add multiplicand (10−7) times |
| | +130 | |
| | +130 | |
| | 1363 | |
| | 6 | 9's complemented product digit |
| | 036 | Partial product for next multiplication |
| ×6=(5+1): | 036 | Partial Product |
| | +130 | Add multiplicand (10−6) times |
| | +130 | |
| | +130 | |
| | +130 | |
| | 556 | |
| | 3 | 9's complemented product digit |
| | 055 | Partial product for next multiplication |
| ×1=(0+1): | 944 | 9's complement of partial product |
| | +130 | Add multiplicand 1 time |
| | 1074 | |
| | 74 | Final product digits |
| | 74360 | Product consists of accumulated underlined product digits |

In the numeric example of the multiplication of 130 by 572, the lowest-order multiplier digit 2 and the previous multiplier digit (which does not exist and is assumed to be 0) are not in different lower (0 through 5) and upper (6 through 9) groups. Therefore, an initial assumed partial product 000 is used, rather than its complement 999. Since the multiplier digit 2 is a number in the lower group, the multiplicand 130 is added to the partial product two times. (The addition is performed in the machine using one digit of the partial product and one digit of the multiplicand at a time. Then, the multiplicand is added again, this time to the resulting sum, one digit at a time.) The digit 0 of the finally resulting sum 260 is the one's place digit of the final product which will result from completion of the multiplication. The digits 026 constitute the partial product for the following multiplication by the next higher multiplier digit 7.

Since the multiplier digit 7 and the previous multiplier digit 2 are in different lower and upper groups, the previous partial product 026 is 9's complemented to produce the complemented partial product 973. Since the multiplier digit 7 is in the upper group, the multiplicand 130 is added to the partial product three (the 10's complement of 7) times, the carry digit 1 of the sum is discarded, the last digit 3 of the sum is 9's complemented to provide the ten's-place product digit 6, and the next more-significant multiplier digit 5 is incremented by 1.

Since the multiplier digit 6 (5+1) and the next-less-significant multiplier digit 7 are not in different lower and upper groups, the partial product 036 is used without being complemented. Since the multiplier digit 6 is in the upper group, the multiplicand 130 is added to the partial product four (the 10's complement of 6) times, the last digit 6 of the sum is 9's complemented to provide the hundred's-place product digit 3, and the next-more-significant multiplier digit 0 is incremented by 1.

Since the carried multiplier digit 1 and the next-less-significant multiplier digit 6 are in different lower and upper groups, the partial product 055 from the preceding step is 9's complemented to provide the partial product 944. Since the multiplier digit 1 is in the lower group, the multiplicand 130 is added once. The carry digit 1 of the resulting sum is discarded and the remaining digits 74 constitute the ten-thousandth-place and thousandth-place digits of the product. The assembled product digits from all steps then give the final product 74,360.

What is claimed is:

1. In a computer, a multiplier in which multiplier digits are of a set having a range of values and each multiplier digit is classified as falling either within a lower group of values or an upper group of values comprising
   a multiplier digit group indicator providing an output indicating whether the multiplier digit is in the lower group or the upper group,
   a previous next-less-significant multiplier digit group indicator initially set to provide a lower-group indicating output,
   a comparator coupled to the outputs of said indicators to provide an output when the multiplier digit and the previous next-less-significant multiplier digit are in different groups,
   an adder having a multiplicand input and a partial product input,
   a complementor having an output connected to the input of said adder and having an input responding to an output from said comparator to 9's complement the partial product for addition,
   means responsive to a lower group output from said multiplier digit indicator to cause said adder to add the multiplicand to the partial product a number of times equal to the value of the multiplier digit, and
   means responsive to an upper group output from said multiplier digit group indicator to cause said adder to add the multiplicand to the partial product a number of times equal to the complement of the value of the multiplier digit, to complement the last digit only of the resulting product, and to increment the next-more-significant multiplier digit.

2. In a computer, a multiplier in which multiplier digits are of a set having a range of values and each multiplier digit is classified as falling either within a lower group of values or an upper group of values, comprising
   a multiplier digit group indicator providing an output indicating whether the multiplier digit is in the lower group or in the upper group,
   a previous next-less-significant multiplier digit group indicator initially set to provide a lower-group indicating output,
   a comparator coupled to the outputs of said indicators to provide an output when the multiplier digit and the previous next-less-significant multiplier digit are in different groups,
   an adder having a multiplicand input and a partial product input,
   a partial product complementor,
   means responsive to an output from said comparator to cause said complementor to 9's complement a partial product before application to said adder,
   means responsive to a lower group output from said multiplier digit indicator to cause said adder to add the multiplicand to the complemented or uncomplemented partial product a number of times equal to the value of the multiplier digit, and
   means responsive to an upper group output from said multiplier digit group indicator to cause said adder to add the multiplicand to the partial product a number of times equal to the complement of the value of the multiplier digit to complement the last digit only of the resulting product, and to increment the next-more-significant multiplier digit.

3. In a computer, a multiplier in which multiplier digits are successively manipulated starting with the least-significant multiplier digit, and in which multiplier digits are of a set having a range of values and each multiplier digit is each classified as falling either within a lower group of values or an upper group of values, comprising
   a multiplier digit group indicator providing an output indicating whether the multiplier digit is in the lower group or in the upper group, a previous next-less-significant multiplier digit group indicator initially set to provide a lower-group-indicating output, a comparator coupled to the outputs of said indicators to provide an output when the multiplier digit and the previous next-less-significant multiplier digit are in different groups, an adder, a multiplicand register coupled to an input of said adder, a partial product register and a 9's complementor coupled to another input of said adder, said complementor being operative in response to a signal from said comparator, means responsive to a lower-group-indicating output from said multiplier digit group indicator to cause said adder to add the multiplicand to the complemented or uncomplemented partial product a number of times equal to the value of the multiplier digit, and means responsive to an upper-group-indicating output from said multiplier digit group indicator to cause said adder to add the multiplicand to the partial product a number of times equal to the complement of the value of the multiplier digit, to complement the last digit only of the resulting product, and to increment the next-more-significant multiplier digit.

4. In a computer, a multiplier in which multiplier digits are classified as falling within a lower group including 0 through 5, or an upper group including 6 through 9, comprising a multiplier digit group indicator providing an output indicating whether the multiplier digit is in the lower group or in the upper group, a previous next-less-significant multiplier digit group indicator initially set to provide a lower-group-indicating output, a comparator coupled to the outputs of said indicators to provide an output when the multiplier digit and the previous next-less-significant multiplier digit are in different groups, a partial product complementor, an adder having a multiplicand input and a partial product input, means responsive to an output from said comparator to cause said complementor to 9's complement the partial product before application to said adder, means responsive to a lower group output from said multiplier digit indicator to cause said adder to add the multiplicand to the complemented or uncomplemented partial product a number of times equal to the value of the multiplier digit, and means responsive to an upper group output from said multiplier digit group indicator to cause said adder to add the multiplicand to the partial product a number of times equal to the 10's complement of the value of the multiplier digit, to 9's complement the last digit only of the resulting product, and to increment the next-more-significant multiplier digit.

5. In a computer, a multiplier in which multiplier digits are successively manipulated starting with the least-significant multiplier digit, and in which multiplier digits are each classified as falling within a lower group including 0 through 5, or an upper group including 6 through 9, comprising a multiplier digit group indicator providing an output indicating whether the multiplier digit is in the lower group or in the upper group, a previous next-less-significant multiplier digit group indicator initially set to provide a lower-group-indicating output, a comparator coupled to the outputs of said indicators to provide an output when the multiplier digit and the previous next-less-significant multiplier digit are in different groups, an adder, a multiplicand register coupled to an input of said adder, a partial product register and a 9's complementor coupled to another input of said adder, said complementor being operative in response to a signal from said comparator, means responsive to a lower-group-indicating output from said multiplier digit group indicator to cause said adder to add the multiplicand to the complemented or uncomplemented partial product a number of times equal to the value of the multiplier digit, and means responsive to an upper-group-indicating output from said multiplier digit group indicator to cause said adder to add the multiplicand to the partial product a number of times equal to the 10's complement of the value of the multiplier digit, to 9's complement the last digit only of the resulting product, and to increment the next-more-significant multiplier digit.

6. In a computer, a multiplier in which multiplier digits are successively manipulated starting with the least-significant multiplier digit, and in which multiplier digits are each classfied as falling within a lower group including 0 through 5, or an upper group including 6 through 9, comprising a multiplier digit group indicator providing an output indicating whether the multiplier digit is in the lower group or in the upper group, a previous next-less-significant multiplier digit group indicator initially set to provide a lower-group-indicating output, a comparator coupled to the outputs of said indicators to provide an output when the multiplier digit and the previous next-less-significant multiplier digit are in different groups, an adder, a multiplicand register coupled to an input of said adder, a partial product register and a 9's complementor coupled to another input of said adder, said complementor being operative in response to a signal from said comparator, means responsive to a lower-group-indicating output from said multiplier digit group indicator to cause said adder to add the multiplicand to the complemented or uncomplemented partial product a number of times equal to the value of the multipler digit, means responsive to an upper-group-indicating output from said multiplier digit group indicator to cause said adder to add the multiplicand to the partial product a number of times equal to the 10's complement of the value of the multiplier digit, to 9's complement the last digit only of the resulting product, and to increment the next-more-significant multiplier digit, and means to transfer the state of the multiplier digit group indicator to the previous next-less-significant multiplier digit indicator and to cause a repetition of the manipulation using the next-more-significant multiplier digit.

7. Means for performing multiplication by manipulations associated with each successive multiplier digit starting with the least-significant digit, comprising a general-purpose stored-program computer system including means for ordering, storing and supplying multiplicand digits, multiplier digits, product digits and partial product digits, wired circuit means for determining whether a multiplier digit and a previous next-less-significant multiplier digit are in different ones of a lower group including numbers 0 through 5 and an upper group including numbers 6 through 9, and if so, 9's complementing a partial product for a following addition step, wired circuit means operative if a multiplier digit is a number in said lower group to add the multiplicand to the complemented or uncomplemented partial product a number of times equal to the value of the multiplier digit, and wired circuit means operative if a multiplier digit is in said upper group to add the multiplicand to the complemented or uncomplemented partial product a number of times equal to the 10's complement of the value of the multiplier digit, to 9's complement the last digit only of the resulting product and to increment the next-more-significant multiplier digit.

References Cited by the Examiner

UNITED STATES PATENTS

| | | | |
|---|---|---|---|
| 3,116,411 | 12/1963 | Keir | 235—164 |
| 3,133,190 | 5/1964 | Eckert | 235—159 |

MALCOLM A. MORRISON, *Primary Examiner.*

ROBERT C. BAILEY, *Examiner.*

T. M. ZIMMER, I. RAIBISCH, *Assistant Examiners.*